United States Patent
Datta et al.

(10) Patent No.: US 10,965,649 B2
(45) Date of Patent: Mar. 30, 2021

(54) PERSISTENT DATA COMMUNICATION SESSIONS ACROSS WAN

(71) Applicant: FatPipe, Inc., Salt Lake City, UT (US)

(72) Inventors: Sanchaita Datta, Salt Lake City, UT (US); Bhaskar Ragula, Salt Lake City, UT (US); Xiaoxiong Fan, Salt Lake City, UT (US); Sankhadip Sengupta, Salt Lake City, UT (US)

(73) Assignee: FatPipe, Inc., Salt Lake City, UT (US)

( * ) Notice: Subject to any disclaimer, the term of this patent is extended or adjusted under 35 U.S.C. 154(b) by 889 days.

(21) Appl. No.: 15/338,341

(22) Filed: Oct. 29, 2016

(65) Prior Publication Data

US 2017/0126626 A1 May 4, 2017

Related U.S. Application Data

(60) Provisional application No. 62/249,070, filed on Oct. 30, 2015.

(51) Int. Cl.
H04L 29/06 (2006.01)

(52) U.S. Cl.
CPC ...... H04L 63/0272 (2013.01); H04L 63/0869 (2013.01); H04L 63/164 (2013.01)

(58) Field of Classification Search
None
See application file for complete search history.

(56) References Cited

U.S. PATENT DOCUMENTS

| | | | |
|---|---|---|---|
| 6,253,247 B1 | 6/2001 | Bhaskar et al. | |
| 6,295,276 B1 | 9/2001 | Datta et al. | |
| 6,493,341 B1 | 12/2002 | Datta et al. | |
| 6,775,235 B2 | 8/2004 | Datta et al. | |
| 7,269,143 B2 | 9/2007 | Datta et al. | |
| 7,406,048 B2 | 7/2008 | Datta et al. | |
| 7,444,506 B1 | 10/2008 | Datta et al. | |
| 7,877,510 B2 | 1/2011 | Datta et al. | |
| 8,356,346 B2 | 1/2013 | Datta et al. | |
| 8,660,129 B1 * | 2/2014 | Brendel | H04L 12/4641 370/397 |

(Continued)

OTHER PUBLICATIONS

"Security Association (SA)", retrieved from >>http://etutorials.org/Networking/Cisco+Certified+Security+Professional+Certification/Part+III+Virtual+Private+Networks+VPNs/Chapter+9+Cisco+IOS+IPSec+Introduction/Security+Association+SA/>>, copyright 2008-2015, 2 pages.

(Continued)

Primary Examiner — Benjamin E Lanier
(74) Attorney, Agent, or Firm — Ogilvie Law Firm

(57) ABSTRACT

Instead of specifying actual transport layer IP addresses as a basis for a secure tunnel's security association, an approach described herein specifies virtual addresses. Then suitable network appliances intercept and modify packets in order to map between the virtual addresses and actual addresses. The virtual addresses satisfy IPsec or another authentication procedure that checks packets using the security association. The actual addresses are used by transport layer protocols. This overlay approach permits a session to failover from one network connection to another without requiring restoration of the session in a newly created secure tunnel after one of the network interfaces becomes unavailable, thereby obsoleting the security association based in part on the IP address of the now unavailable interface. This innovative approach also allows the use of parallel paths and the use of one-to-many or many-to-one path topologies, which would otherwise not be permitted.

20 Claims, 6 Drawing Sheets

(56) References Cited

U.S. PATENT DOCUMENTS

| | | | |
|---|---|---|---|
| 8,780,811 B1 | 7/2014 | Datta et al. | |
| 8,995,252 B2 | 3/2015 | Datta et al. | |
| 9,832,118 B1* | 11/2017 | Miller | H04L 45/586 |
| 9,876,717 B2* | 1/2018 | Alkhatib | H04L 29/12047 |
| 2009/0328192 A1* | 12/2009 | Yang | H04L 12/4641 |
| | | | 726/15 |
| 2013/0136133 A1* | 5/2013 | Alkhatib | H04L 29/12047 |
| | | | 370/392 |
| 2015/0124966 A1* | 5/2015 | Smedman | H04W 48/18 |
| | | | 380/270 |

OTHER PUBLICATIONS

"Group Domain of Interpretation", retrieved from <<https://en.wikipedia.org/wiki/Group_Domain_of_Interpretation>>, Nov. 10, 2014, 3 pages.

"Internet Key Exchange", retrieved from <<https://en.wikipedia.org/wiki/Internet_Key_Exchange>>, Jan. 11, 2015, 7 pages.

"IPsec", retrieved from <<https://en.wikipedia.org/wiki/IPsec>>, Apr. 19, 2015, 10 pages.

"Internet Security Association and Key Management Protocol", retrieved from <<https://en.wikipedia.org/wiki/Internet_Security_Association_and_Key_Management_Protocol>>, Apr. 1, 2015, 3 pages.

"FatPipe MPVPN Version 7.1.2 User's Manual" excerpts, no later than Oct. 19, 2016, 13 pages.

"Security Architecture for the Internet Protocol" (RFC 4301), retrieved from <<https://tools.ietf.org/html/rfc4301>>, Dec. 2005, 102 pages.

"Internet Key Exchange (IKEv2) Protocol" (RFC 4306), retrieved from <<https://tools.ietf.org/html/rfc4306>>, Dec. 2005, 100 pages.

"Security association", retrieved from <<https://en.wikipedia.org/wiki/Security_association>>, Feb. 19, 2015, 2 pages.

"Security Parameter Index", retrieved from <<https://en.wikipedia.org/wiki/Security_Parameter_Index>>, Apr. 25, 2015, 1 page.

\* cited by examiner

PERSISTENT DATA COMMUNICATION SESSIONS ACROSS WAN

RELATED APPLICATION

The present application hereby incorporates by reference the entirety of, and hereby claims priority to, U.S. provisional patent application No. 62/249,070 filed Oct. 30, 2015.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A virtual private network, or VPN, is a private network which extends across a public network such as a portion of the Internet. It is a private network in that it uses a private IP address space, and it typically uses encryption or authentication or both to provide greater security than the public network. Some VPNs use security associations, which define endpoint pairs of links in the VPN. Internet Protocol Security, known as IPSec (or IPSEC or IPsec), includes protocols for establishing mutual authentication between agents at link endpoints and negotiating cryptographic keys to be used during communication sessions over links. IPsec can be used to create VPNs.

SUMMARY

Some examples provided herein permit continued use of a VPN tunnel security association even when one or more of the interfaces used to transmit or receive packets sent through the tunnel change. Instead of specifying actual IP addresses as a basis for the security association, as one does conventionally, one specifies virtual addresses and then the system intercepts and modifies packets in order to map between the virtual addresses (which satisfy the IPsec or other authentication procedure that checks packets using the security association) and the actual addresses (which are used by TCP and other transport layer protocols). In addition to permitting failover without requiring creation of a new secure tunnel, this approach allows the use of parallel paths and the use of one-to-many or many-to-one path topologies, which are not permitted with conventional uses of security associated addresses.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DESCRIPTION

Figure 1:
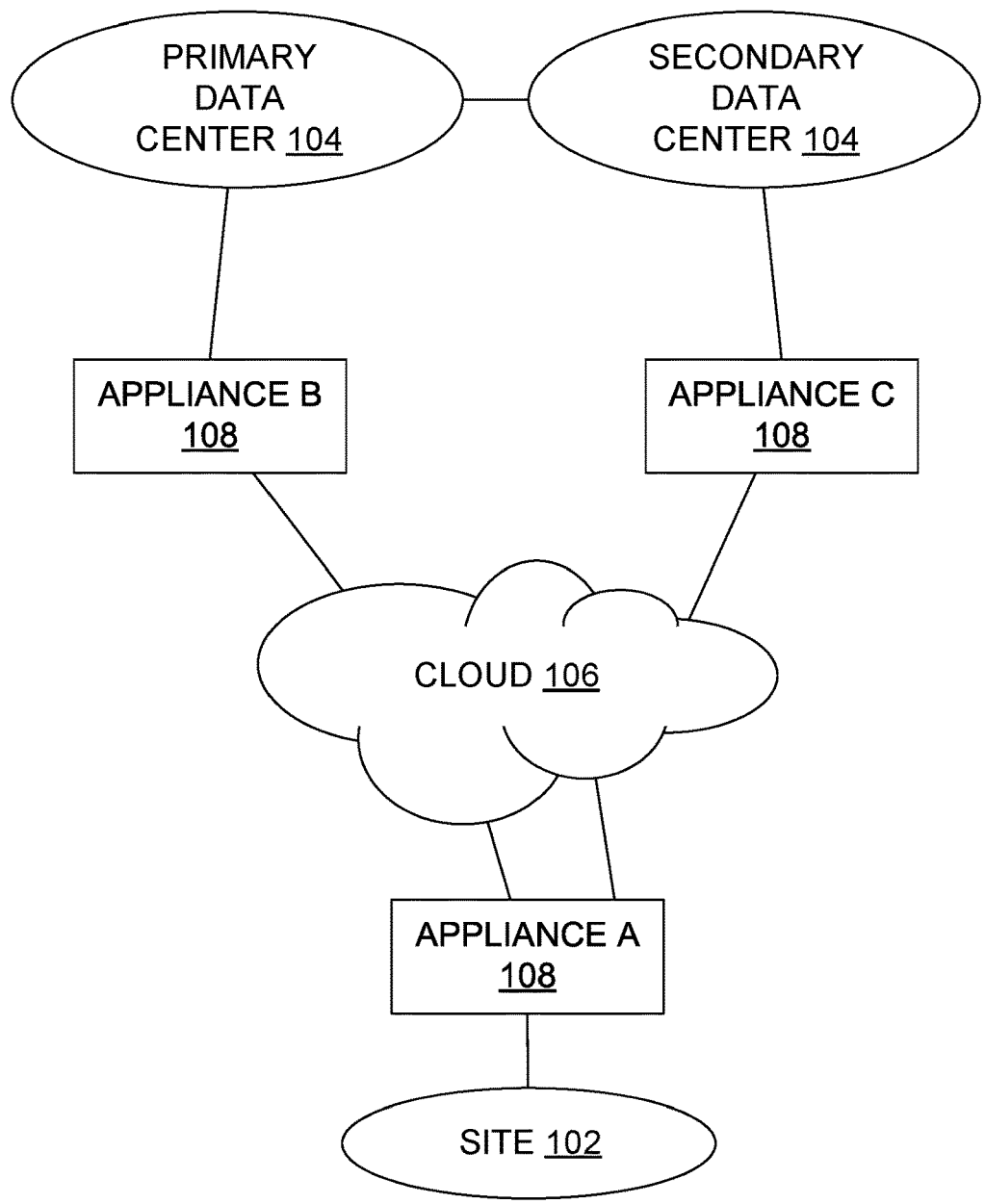
FIG. 1 is a diagram illustrating a network configuration in which a site is connectable to data centers through a cloud, such as a portion of the Internet, by way of appliances.
Figure 10:
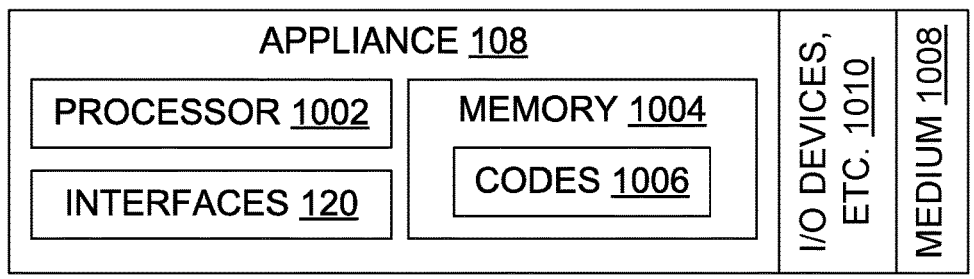
FIG. 10 is a block diagram illustrating aspects of an example virtual private network (VPN) appliance architecture.

The examples given below are merely illustrative, and are not intended to fully identify key features or essential features of the claimed subject matter, nor are they intended to be used to limit the scope of the claimed subject matter.

Some embodiments described herein may be viewed in a broader context. For instance, concepts such as addresses, load balancing, security, and translation may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving addresses, load balancing, security, and/or translation are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical problems such as the disruption of ipsec secure communications when an IP address changes, and the various peculiarities of packet transmission protocols. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein utilize logical path overlays according to rules and mechanisms described herein.

Reference is made to exemplary embodiments, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be added in subsequent filings along with figures, but they are not required to understand the present disclosure. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file. In the event of a conflict between terminology presented inline here and terminology incorporated herein by reference, inline definitions govern.

As used herein, a "computer system" may include, for example, an appliance 108, a user machine 116, or one or more servers 110. The computer system may be or include one or more motherboards, processing nodes, personal computers (portable or not), personal digital assistants, smartphones, cell or mobile phones, tablets, laptops, other mobile devices having at least a processor 1002 and a memory 1004, and/or other device(s) providing one or more processors 1002 controlled at least in part by instructions. The instructions may be in the form of firmware 1006 or other software 1006 in memory and/or specialized circuitry. In particular, although it may occur that many embodiments run on routers, WAN usage optimizers, or failover controllers, but other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" 1002 is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code 1006 written by programmers (who are also referred to as developers).

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory 1004 and/or computer-readable storage medium 1008, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory 1004 or other computer-readable storage medium, including for instance removable computer-readable storage medium 1008, is not a signal per se and is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media 1008 and computer readable memory 1004, on the one hand, which are statutory subject matter, and (b) transmission media, also referred to as signal media, on the other hand, which the Office views as non-statutory subject matter. A transmission medium is a propagating signal or a carrier wave computer readable medium. By contrast, computer readable storage media and computer readable memory (also referred to as memory devices) are not propagating signal or carrier wave computer readable media. As used herein, "computer readable medium" means a computer readable storage medium, not a propagating signal per se.

An operating environment for a computer-implemented embodiment may include a computer system. The computer system may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system may be configured for end-users, e.g., with applications, for administrators, as a server, as a distributed processing node, and/or in other ways.

Human users may interact with the computer system by using displays, keyboards, and other peripherals 1010, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

System administrators, developers, engineers, and end-users are each a particular type of user. Automated agents, scripts, playback software, and the like acting on behalf of one or more people may also be users. Storage devices and/or networking devices may be considered peripheral equipment in some embodiments. Other computer systems may interact in technological ways with the computer system or with another system embodiment using one or more connections to a network via network interface 120 equipment, for example.

The computer system includes at least one logical processor 1002. The computer system, like other suitable systems, also includes one or more computer-readable storage media 1004, 1008, or both. Media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 1008 such as a portable (i.e., external) hard drive, CD, DVD, memory stick, or other removable non-volatile memory medium may become functionally a technological part of the computer system when inserted or otherwise installed, making its content accessible for interaction with and use by processor. The removable configured medium is an example of a computer-readable storage medium. Some other examples of computer-readable storage media include built-in RAM, ROM, hard disks, and other memory storage devices which are not readily removable by users. For compliance with current United States patent requirements, neither a computer-readable medium nor a computer-readable storage medium nor a computer-readable memory is a signal per se.

The medium 1004 or 1008 or both is configured with instructions that are executable by a processor; "executable" is used in a broad sense herein to include machine code, interpretable code, bytecode, and/or code that runs on a virtual machine, for example. The medium is also configured with data which is created, modified, referenced, and/or otherwise used for technical effect by execution of the instructions. The instructions and the data configure the memory or other storage medium in which they reside; when that memory or other computer readable storage medium is a functional part of a given computer system, the instructions and data also configure that computer system. In some embodiments, a portion of the data is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., appliance, general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components 1010. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

The code 1006 and other items may each reside partially or entirely within one or more hardware media, thereby configuring those media for technical effects which go beyond the "normal" (i.e., least common denominator) interactions inherent in all hardware—software cooperative operation. In addition to processors (CPUs, ALUs, FPUs, and/or GPUs) 1002, memory 1004/storage media 1008, display(s) 1010, and battery(ies), an operating environment may also include other hardware, such as buses, power supplies, wired and wireless network interface cards 120, and accelerators, for instance, whose respective operations are described herein to the extent not already apparent to one of skill. CPUs are central processing units, ALUs are arithmetic and logic units, FPUs are floating point processing units, and GPUs are graphical processing units.

Some embodiments provide a computer system with a logical processor and a memory medium configured by circuitry, firmware, and/or software to provide technical effects such as maintenance of a secure session despite changes in IP addresses assigned to one or more interfaces 120 that participate in the session.

In some embodiments peripherals 1010 such as human user I/O devices (screen, keyboard, mouse, tablet, microphone, speaker, motion sensor, etc.) will be present in operable communication with one or more processors and memory. Software processes may be users.

In some embodiments, the system includes multiple computers connected by a network, e.g., LAN 114, or the Internet 112 or another cloud 106. Networking interface equipment 120 can provide access to networks, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" 106 computing environment and/or a "cloud" 106 storage environment in which computing services are not owned but are provided on demand.

Any step stated herein is potentially part of a process embodiment. In a given embodiment zero or more stated steps of a process may be repeated, perhaps with different parameters or data to operate on. Steps in an embodiment may also be done in a different order than the order that is stated in examples herein. Steps may be performed serially, in a partially overlapping manner, or fully in parallel. The order in which steps are performed during a process may vary from one performance of the process to another performance of the process. The order may also vary from one process embodiment to another process embodiment. Steps may also be omitted, combined, renamed, regrouped, or otherwise depart from the stated flow, provided that the process performed is operable and conforms to at least one claim of this or a descendant disclosure.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some embodiments include a configured computer-readable storage medium 1008. Medium may include disks (magnetic, optical, or otherwise), RAM, EEPROMS or other ROMs, and/or other configurable memory 1004, including in particular computer-readable media (as opposed to mere propagated signals). The storage medium which is configured may be in particular a removable storage medium 1008 such as a CD, DVD, or flash memory. A general-purpose memory 1004, which may be removable or not, and may be volatile or not, can be configured into an embodiment using items such as a logical path table 302 and a session table 302, in the form of data and instructions, read from a removable medium and/or another source such as a network connection, to form a configured medium. The configured medium is capable of causing a computer system to perform technical process steps as disclosed herein. Examples thus help illustrate configured storage media embodiments and process embodiments, as well as system and process embodiments.

Glossary 3G, 4G: third generation, fourth generation (telecommunications)
API: application program interface
BGP: border gateway protocol
DHCP: dynamic host configuration protocol
DIA: dedicated internet access
DSL: digital subscriber line
EIGRP: enhanced interior gateway routing protocol
ESP: encapsulating security payload
GRE: generic routing encapsulation
GUI: graphical user interface
HQ: headquarters
IKE: internet key exchange
IP: internet protocol
IPsec: internet protocol security
JSON: JavaScript object notation
LAN: local area network
LTE: long-term evolution (telecommunications)
MPLS: multiprotocol label switching
MPSec®: mark of FatPipe Networks, for communications connectivity software. Used herein as an example of overlay software which uses or maps logical paths as opposed to physical paths, in a network.
NAT: network address translation
OSPF: open shortest path first
QOS: quality of service
REST: representational state transfer; RESTful means using REST
RFC: request for comments
RIP: routing information protocol
RSA: Rivest Shamir Adleman (cryptosystem)
SNMP: simple network management protocol
TCP: transmission control protocol
UDP: user datagram protocol
VoIP: voice over IP
VPN: virtual private network
WAN: wide area network
XML: extensible markup language Although reference may be made to "FatPipe" devices or protocols herein, this is solely for convenience. The teachings herein are not limited to controllers, devices, protocols, software, or services provided by FatPipe Inc., the assignee of the current patent rights. Whether a claim is infringed is to be determined on the basis of accused technology's functionality and claim limitations; being an entity other than FatPipe is not itself a permission to use the technology described herein. Likewise, although corporations and corporate sites (e.g., HQ, branch) are used as examples, the teachings herein also apply to other entities, e.g., government agencies, educational institutions, limited liability companies, business or trade associations, and so on.

Capitalization variants appear herein, but will be understood as referring to the same item, e.g., IPsec, Ipsec, and ipsec can be used interchangeably so far as the teachings herein are concerned.

Additional details and design considerations are provided below. As with the other examples herein, the features described may be used individually and/or in combination, or not at all, in a given embodiment.

REFERENCE NUMERAL LIST

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

102: site
104: data center
106: cloud computing network/service
108: innovative appliance
110: server
112: internet
114: LAN
116: user machine
118: IP address
302: tables used in mapping actual addresses to/from security association addresses
402: communication link
700: flowchart showing setup and mapping of packet outgoing from source
702: selecting local external IP address for security association
704: local external IP address for security association
706: obtaining local network info
708: local network IP address (part of local network info)
710: local network subnet mask (part of local network info)
712: selecting remote external IP address for security association
714: remote external IP address for security association
716: obtaining remote network info
718: remote network IP address (part of remote network info)
720: remote network subnet mask (part of remote network info)
722: establishing VPN tunnel
724: VPN tunnel
726: security association for VPN tunnel
728: pre-shared secret for VPN tunnel
730: RSA (Rivest Shamir Adelman cryptosystem) signature for VPN tunnel
732: intercept outgoing packet
734: outgoing packet (outgoing from either end of link toward other end of link), also used to denote the packet where it comes off an actual link as an incoming packet
736: get actual link source and destination IP addresses, which may differ from addresses specified in security association 738: actual link source and destination IP addresses (IPv4 or IPv6), namely, the IP addresses used by TCP, UDP, or another transport protocol 740: load balancing 742: failing over 744: optimizing routing functionality, e.g., by one or more of compression, de-duplication, encryption, load balancing, failover, or quality-of-service control 746: mapping from security associated IP addresses to actual link IP addresses 748: transmitting packet onto actual link 750: source of packet 800: flowchart showing mapping of received packet and forwarding to destination 802: intercept incoming packet 804: mapping from actual link source and destination IP addresses back to security associated source and destination IP addresses, this is also referred to as restoring the security associated IP addresses 806: submitting incoming packet with restored security associated IP addresses to VPN security code 808: VPN security code, e.g., code implementing IPsec packet authentication 810: authenticating packet 812: forwarding received and authenticated packet 814: packet destination 900: flowchart showing peer appliance authentication 902: initialize peer appliances, e.g., exchange mappings 904: authenticating or re-authenticating peer appliance 906: sending packets from appliance at source location 908: receiving packets at appliance at destination location 910: terminating communication if authenticating or re-authenticating of peer appliance fails 1002: processor(s)

1004: memory(ies)

1006: code, e.g., firmware, executed code, interpreted code

1008: removable computer-readable storage medium

1010: I/O devices, peripherals, other hardware

VPN Site to Site Failover, or load balancing, for cloud computing network.

With reference to FIG. 1, an entity site 102 such as a corporation campus, corporate headquarters, branch office site, local office of an institution, or other site 102 relies heavily on its WAN for connectivity to all its branches and (other) remote sites (for clarity of illustration only one of the sites 102 is shown in FIG. 1). The various branches and remote sites also depend on their connectivity to data center(s) 104 for access to information. Cloud computing networks 106 allow corporations, government agencies, and other entities to store information and data on globally accessible servers in the cloud 106. For enhanced reliability, servers in a cloud network 106 or data center 104 are backed up or mirrored to servers located in physically separate locations, e.g., to a secondary data center. Corporate offices and branches connect to the servers in the datacenter with VPN tunnels using IPSec or SSL or any other encryption technology.

One of the major issues facing the corporate network managers is the ability to fail over connections to the backup datacenter, at a geographically disparate location, if connectivity to the primary data-center fails. Conventionally, if a datacenter loses connectivity or fails, either a datacenter operator has to make provisions for redirecting traffic to backup datacenter or a corporate or other entity IT manager has to manually intervene to redirect the traffic. This intervention can take from minutes to hours as was evidenced by an Amazon network failure.

A cost advantage of this technology is that the data centers charge based on data usage on the networks. In some cases, one pays for the use of a backup datacenter only if the primary datacenter has problems.

Various solutions described herein allow for seamless failover of the traffic from primary to backup servers in the cloud. There are several approaches, including the following among others:

(1) A proprietary appliance 108 at each of the corporate remote locations 102 and also at the datacenters 104, as illustrated in FIG. 1.

(2) A proprietary appliance 108 at each of the corporate remote locations but not at the data center; in the special case illustrated by FIG. 1, this would include appliance A but not appliances B and C.

(3) A proprietary appliance 108 at each of the corporate locations, at the datacenter in the cloud 106 and at the backup datacenter, which is either at the HQ or in the cloud.

Depending on the implementation, technology in an embodiment may be characterized in one or more of the following ways. All data lines are operational. All Servers are operational. There are multiple data links at the Corporate and/or Remote offices. If required, encryption can be enabled on the data links between an Office and a data center. Communication from Corporate/Remote/Branch is directed to the primary data center. The appliances 108 check the health of each other, the health of data links, and the availability of servers. If the link to Primary 104 fails, a VPN tunnel to the backup data center is established and all traffic is transferred over to the backup. If any of the servers becomes non-responsive to its IP address or its name resolution, traffic is failed over. The quality of the lines is measured for bandwidth, latency, packet loss and jitter. If any of these measurements cross preset limits, traffic is failed over to the better quality line. If all lines degrade or fail, then the backup VPN is created and traffic is failed over to the backup. An appliance 108 is able to redirect specific traffic to a different server at different datacenter.

Persistent Data Communication Sessions across a Hybrid WAN in a cloud environment.

In hybrid networks or hybrid WANs, multiple data links at the remote or branch office are used to connect to the information residing in the servers at the data center. The links can be a combination of MPLS and internet (broadband—DSL/Cable/3G/4G/LTE/WiFi/DIA). The datacenter may have one data link or multiple data links. The present innovation allows seamless failover of data sessions in case one of the multiple lines fails at either the data center or the remote branch office.

Figure 2:
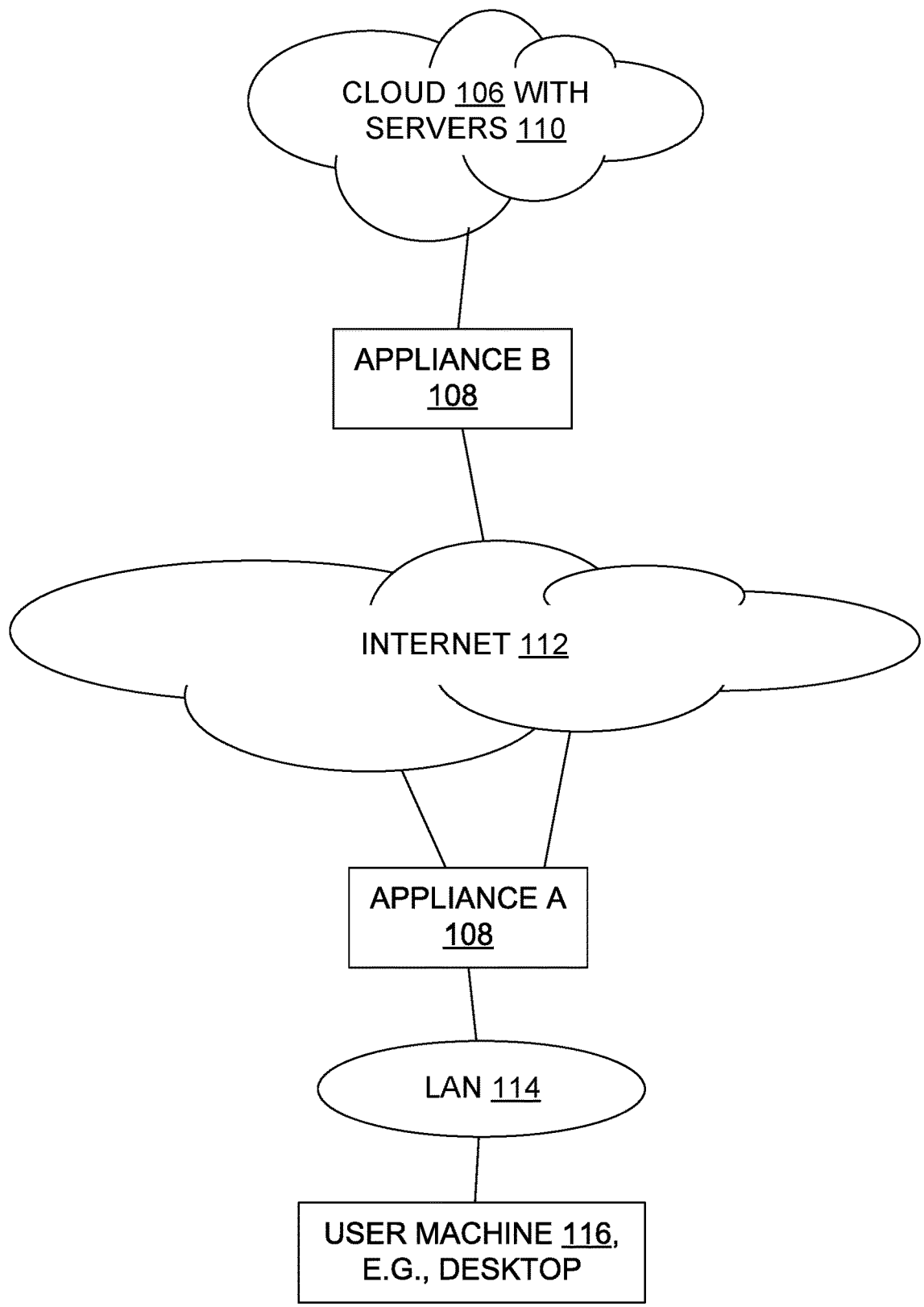
FIG. 2 is a diagram illustrating a network configuration in which a user machine is connectable to servers through a portion of the Internet by way of appliances.

With reference to FIG. 2, a FatPipe device or other appliance 108 resides at a Remote office and at a data center in the cloud. The datacenter is hosted by a cloud service provider. The appliance 108 can be a physical appliance or a virtual appliance. The embodiment creates multiple logical paths between the branch office and the data center. It also creates multiple tunnels over the two or more data paths between the remote site 102 and datacenter.

Depending on the implementation, technology in an embodiment may be characterized in one or more of the following ways.

Multiple VPN security associations 726 can be created between two endpoints. This can be accomplished in at least two ways. In one, an appliance 108 creates a single VPN tunnel between two end points and creates multiple paths in-between. Another approach creates multiple VPN tunnels between two endpoints over multiple paths. Multiple paths at a remote location may correspond to a single path at a datacenter, as shown in FIG. 2, which has two links between appliance A and the Internet; each link provides a different path.

With regard to creating multiple VPN security associations 726 between two endpoints, one of skill will acknowledge that typical, bi-directional communication between two IPsec-enabled systems uses a pair of simplex connection security associations (one in each direction) in the sense, e.g., of RFC 4301. In particular, IKE explicitly creates security association SA pairs in recognition of this common usage requirement. However, such a pair is conveniently referred to as a single security association both herein and elsewhere.

Some embodiments herein use a default IPSec implementation, in the sense that there is only one SA 726 per IPSec tunnel and SA multicast does not apply. However, this tunnel is not necessarily limited to IPSec only, since teachings herein could also apply to an SSL tunnel or any secured or non-secure tunnel.

In some embodiments, one can initiate a data session over one logical path and if the data line were to fail, the technology can failover the session without interrupting the data session, may it be TCP or UDP, VoIP or Video, or a simple file transfer.

Some embodiments include IPSec/MPSec logic in appliances 108, which is illustrated by the following examples.

Example 1

Appliance A to Appliance B with a single IPSec tunnel and multiple MPSec Paths. In this case, only a single SA 726 is needed. An appliance can change or encapsulate an encrypted packet's source/destination address to create multiple paths for the single IPSec tunnel. That single IPSec tunnel has one shared secret 728 or certificate 730.

Example 2

Appliance A to Appliance B with a single IPSec tunnel and multiple MPSecPaths, Appliance A to Fatpipe C with a single IPSec tunnel and multiple MPSecPaths. A LAN subnet behind Appliance B and one behind Appliance C are identical. The Appliance B and Appliance C each has a different WAN IP address. In an example 2.1, Appliance B's interface and Appliance C's LAN interface are not connected to the same switch or same virtual switch. This is useful, e.g., for a Disaster Recovery Site Deployment case where Appliance B and Appliance C are connected to the different LAN sides' PCs or servers with same LAN network configuration in terms of LAN subnet definition. In an example 2.2 Appliance B's interface and Appliance C's LAN interface are connected to the same switch or same virtual switch. This is useful, e.g., where Appliance B and Appliance C are connected to the same LAN side PCs or servers.

This does not imply encapsulating IPSec inside MPSec, since these example embodiments do not encapsulate IPSec. They maintain a table 302 that keeps track of source and destination IPs. They strip and replace IPs with MPSec path identifiers. This stripping and replacing of IP addresses is described further in connection with FIG. 3, and also as mappings discussed in FIGS. 7 and 8.

Figure 3:
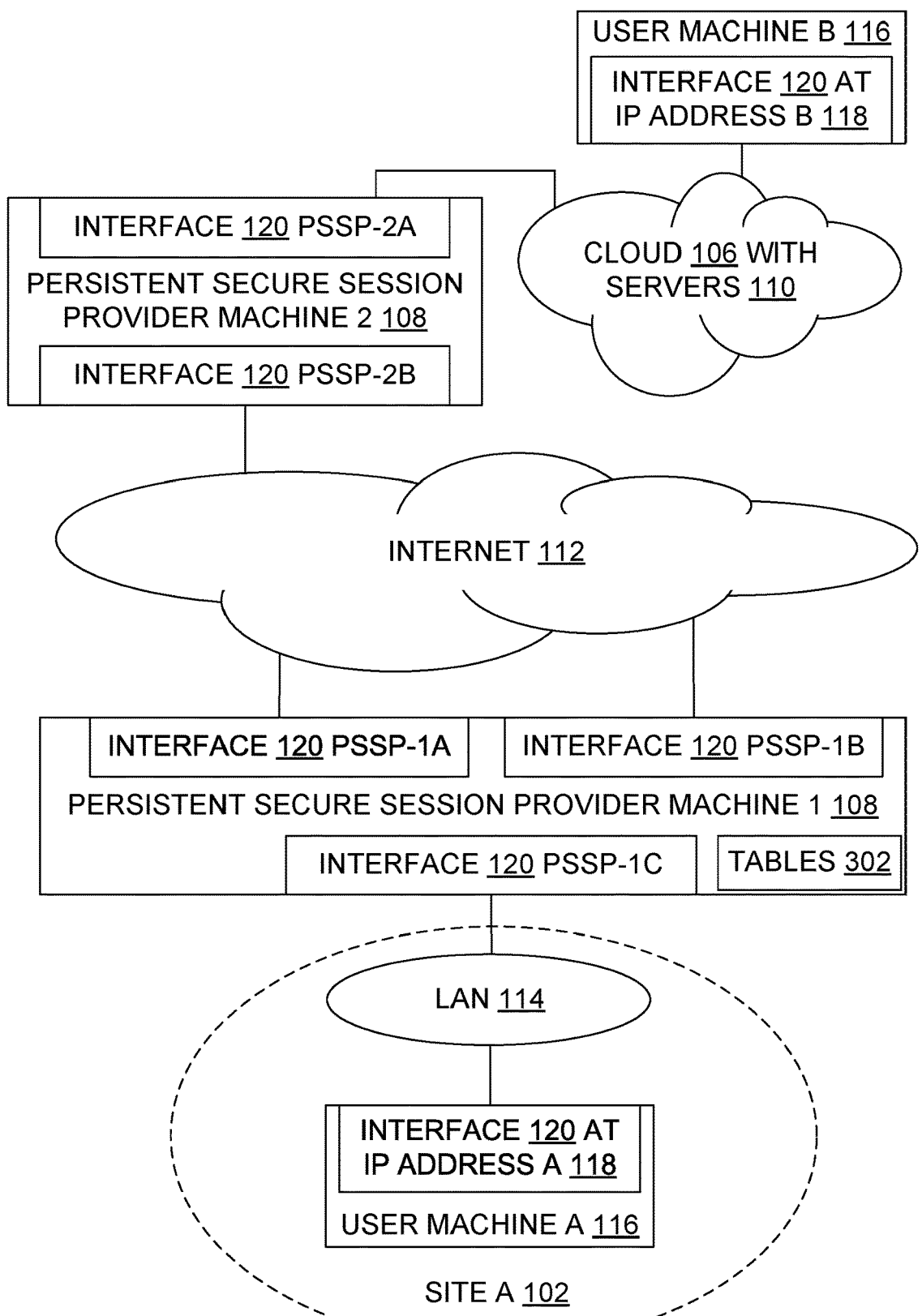
FIG. 3 is a diagram illustrating a network configuration in which two user machines are connectable to one another through a portion of the Internet by way of appliances, with interfaces and IP addresses called out as particular examples.

With reference to FIG. 3, some embodiments set up a VPN between an appliance 1 (also referred to in this example as persistent secure session provider machine 1) at Site A and an appliance 2 in the cloud. Appliance 1 is aware of its two links and establishes connections to communicate with appliance 2 over its two links and one link at appliance 2. When packets flow, at user machine A (e.g., a desktop 116), IPA→IPB. That is, a source IP address 118 denoted here IPA and a destination address denoted here as IPB are in an outgoing packet. IPA is the IP address at the network interface 120 on machine A. IPB is the IP address at the network interface 120 on machine B. When the packet is received at IPF1 (an interface on appliance 1 facing the desktop LAN 114; this interface is also denoted in FIG. 3 as PSSP-1C), then it is still an IPA→IPB packet. Appliance 1 changes 746 it, e.g., to IPW2→IPW3 or IPW1→IPW3, where IPW2 is also denoted in the Figure as PSSP-1A, IPW3 is also denoted in the Figure as PSSP-2B, and IPW1 is also denoted in the Figure as PSSP-1B. Appliance 2 changes 804 the addresses back, so the packet is again an IPA→IPB packet.

To accomplish these operations, one embodiment maintains tables 302 of all sites and relates LAN and WAN IPs to maintain relationships. Then it can strip the headers and put in new headers or it can encapsulate. It can fragment, de-fragment and re-order/re-sequence data packets. It can also duplicate and reorder packets to reduce effects of packet loss. An embodiment may also do peer detection to identify peer appliances 108. An embodiment may also do auto-detection wherein the remote appliance calls the central appliance to download all its configuration data.

In some such embodiments, data can flow from a branch over multiple lines to a single line in the cloud, e.g., as in FIG. 2. Some can load balance traffic in a 2:1 link relationship, e.g., as in FIG. 6. Some can failover traffic between links without UDP or TCP or many other protocols. Some can do these operations with or without packet encapsulation. Some measure the line quality with jitter, latency and packet loss measurements. Some identify applications based on IP addresses, port numbers, packet size (unique—voice and video have different packet sizes) and protocol.

With further reference to FIG. 3, one process includes the following.

1. A VPN is established 722 between PSSP machine 1 and PSSP machine 2 for bidirectional communication using one security association in each direction. This pair of security associations is the "SA pair" 726.

2. PSSP machine 1 establishes a first connection, between PPSP-1A and PSSP-2B. An MPSec tunnel association is created, e.g. in a table 302.

3. PSSP machine 1 establishes a second connection, between PPSP-1B and PSSP-2B. Another MPSec tunnel association is created.

4. Now assume a packet is sent 906 at user machine A intended for user machine B. The packet has source IP address A and destination IP address B.

5. The packet travels through the LAN to PSSP machine 1, and still has source IP address A and destination IP address B when it reaches interface PSSP-1C.

6. Inside PSSP machine 1, the packet may be subject to operations 744 such as compression, de-duplication, encryption, load balancing, failover, quality-of-service, etc. Depending on such processing, the addressing is modified 746 to either PSSP-1A or PSSP-1B as the source address and PSSP-2B as the destination address, and the packet is sent over the corresponding WAN interface.

7. The packet travels through the internet to arrive at PSSP machine 2 interface PSSP-2B.

8. Inside PSSP machine 2, the packet addressing is modified 804 back to source IP address A and destination IP address B.

9. The packet travels through the cloud to arrive at user machine B or server B.

It does not inherently matter which interface 120 of PSSP machine 1 is used to establish the VPN. Either interface can be used. An implementation could also use a third interface that is not connected to a line. This availability helps maintain VPN tunnels even when the line is down or the IP addresses 1A or 1B change.

For example, assume the following addresses and subnets:

Appliance A: WAN1: 1.1.1.1/24 WAN2: 2.2.2.1/24 WAN3: 11.11.11.2/24

Appliance B: WAN1: 1.1.1.2/24 WAN2: 2.2.2.2/24 WAN3: 10.10.10.1/24

Link Appliance A and Appliance B with physical connection (i.e., actual link) on WAN1-WAN1, WAN2-WAN2, WAN3-WAN3. Since Appliance A's WAN1/WAN2 and Appliance B's WAN1/WAN2 are each on the same respective subnet, they could send/receive packets on WAN1 and/or WAN2. The WAN3 subnet, however, is different between Appliance A and Appliance B, so it is conventionally not possible to send packets between Appliance A's WAN3 and Appliance B's WAN3. An embodiment creates an IPSec Tunnel between Appliance A's WAN3 ip address and Appliance B's WAN3 ip address. Then it creates an MPSecpath (or other logical path) between Appliance A and Appliance B for each respective pair, namely, WAN1-WAN1, WAN2-WAN2, and WAN3-WAN3. Without MPSec or another logical path, the IPSec tunnel could not connect. With MPSec, the IPSec tunnel will be connecting fine and transmit data between WAN1-WAN1, WAN2-WAN2, because the embodiment translates addresses in packets as needed to correlate the logical path with the underlying IPSec tunnel. This provides an improvement over the conventional approach, by providing greater connectivity.

In some implementations, and with regard to making load balance decisions and embedding a load balance decision into a packet structure, the following data structures or similar data structures may be used in code 1006. "Similar" data structures include those with different identifiers but corresponding functionality, those with additional fields that do not hamper the load balancing functionality, and those that are implemented in different programming language(s), for example.

```
struct path_info
{
    struct net_device* wan_device;
    int32 remote_ip;
};
struct iphdr {
#if defined(__LITTLE_ENDIAN_BITFIELD)
    __u8    ihl:4,
        version:4;
#elif defined (__BIG_ENDIAN_BITFIELD)
    __u8    version:4,
        ihl:4;
#else
#error "Please fix <asm/byteorder.h>"
#endif
    __u8    tos;
    __be16  tot_len;
    __be16  id;
    __be16  frag_off;
    __u8    ttl;
    __u8    protocol;
```

-continued

```
    __sum16 check;
    __be32  saddr;
    __be32  daddr;
    /* The options start here. This is for ipv4; ipv6 is handled similarly. */
};
struct packet
{
    struct path_info path_info;
    struct iphdr* iph;};
```

To send a packet from WAN2 to remote ip 1.1.1.1, for example, an embodiment may perform operations including the mapping represented by the following code:

```
packet->path_info->wan_device = wan2_device;
packet->path_info->remote_ip = inet_addr("1.1.1.1");
```

At a network device which translates network addresses, an embodiment may perform operations including the mapping represented by the following code:

```
packet->iph->saddr = remote_ipsec_external_ip
packet->iph->daddr = local_ipsec_external_ip
```

In some embodiments, both sender 108 and receiver 108 will maintain two tables 302 or similar data structures, namely, an MPSectable (or other logical path table) and a session table. In the logical path table 302, the columns are local WAN interfaces, and the rows are remote WAN interfaces. In the session table 302 the columns are the attributes of the layer3 and layer4 protocol information. Each session representing the packets has the same layer3 (protocol, source address, destination address) and layer 4 attributes (source port, destination port). One suitable data structure is the following:

```
struct session
{
    struct link_node* next; //Link to the next session
        int8 protocol;
        int32 source_address;
        int32 destination_address;
    int16 source_port;
    int16 destination_port;
    struct path_info path_info;
} ;
```

In some embodiments, packets include a session ID. This session identifier is not a single value, rather, it is a combination of all the layer3 and layer4 attributes.

In some embodiments, for each MPSecpath, the embodiment knows its path current status (e.g., one or more of the link status, packet loss, latency, jitter, line bandwidth, used bandwidth, and the total session count). The total session count is used to make load balance decisions when the load balance is based on path weight. If path weight number is higher, then more sessions will be assigned on that path.

In some embodiments, the session table 302 is used for matching a packet to its respective session so the following packet will not go through policy routing rule, MPSecrule and IPSec rule matching again. During Encryption, the IPSec rule is first matched, then the embodiment finds a corresponding MPSecrule. First encryption, then load balance. During Decryption, the MPSecrule is first matched, then the embodiment finds a corresponding IPSec rule. First recover the original IPSec packet, then decrypt.

The logical paths technology described herein may be described as an "overlay technology", to the extent it uses MPSecpaths (or other logical paths) to load balance the tunnelled traffic.

Additional VPN Configurations

Figure 4:
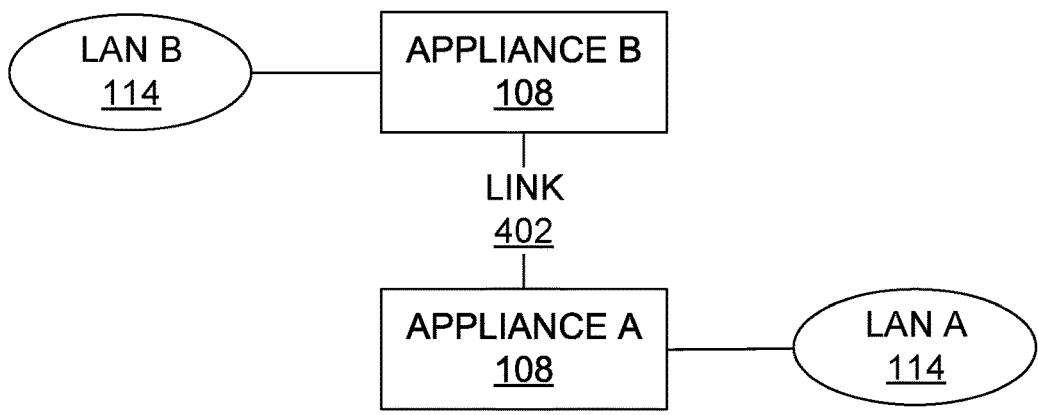
FIG. 4 is a diagram illustrating a network configuration in which two local area networks (LANs) are connectable to one another through a secure link, which may be a virtual link.

Conventionally, setting up a VPN tunnel involves creating a security association between two endpoints of the tunnel, which are specified as WAN interface IP addresses. Two respective authentic sites behind the two endpoints are also specified, either as individual destination IP addresses or as an address range in the form of an address and a subnet mask. This conventional approach presumes a network configuration like the one in FIG. 4. The link 402 would be the only physical link in the VPN tunnel, and the security association would associate the WAN interface IP addresses of the endpoints of link 402. The sites would be specified using IP address and subnet mask info for each of LAN A 114 and LAN B 114. A limitation of this conventional approach is that if physical link 402 goes down, then the security association becomes useless because it is based on an address of a WAN interface that is no longer available. Any session in progress through the VPN tunnel over link 402 is interrupted, and effectively terminated. A new VPN tunnel and new session must then be created for secure communications to resume between sites A and B, using a different WAN interface address to replace the one that became unavailable.

An insight behind some embodiments described herein is that even though conventionally the IP addresses of the security association endpoints are the actual WAN interface addresses used in the transport protocols, with appropriate packet interceptions and address mappings and packet modifications a VPN tunnel can work even when the IP addresses of the security association endpoints are not the actual WAN interface addresses. In their place, virtual addresses can be used as the IP addresses which are joined by the security association. These virtual addresses can be the IP addresses of WAN interfaces other than the actual endpoints, or they can be IP addresses which are not any of the WAN interface addresses of the appliances at the tunnel's endpoints. When virtual addresses are used in a security association, together with appropriate packet interceptions (e.g., 732, 802) and address mappings (e.g., 746, 804) and packet modifications (understood herein to be part of the mapping steps, or a corollary thereof), the security association can survive the loss of an actual link. Sessions can be moved to another link, transparently to the source and destination machines that are using the session. The delays that would be incurred by creating a new VPN tunnel with a new security association and starting a new session in that tunnel can be avoided.

From the perspective of the source and destination, the network configuration is unchanged when virtual addresses are used in a security association with appropriate packet interceptions and address mappings. Thus, from the perspective of LAN A and LAN B, communications in FIG. 4 may be performed using a conventional security association with WAN interface IP addresses, or they may be performed using an innovative tunnel whose security association includes one virtual IP address as an endpoint address, or two virtual IP addresses as endpoint addresses.

Even if there is only one actual link in use, using virtual addresses in a security association and packet interceptions and address mappings as taught herein can be advantageous. For example, the security association may survive a network driver restart, a network interface card re-initialization or replacement, or another event that would invalidate a conventional security association.

Figure 5:
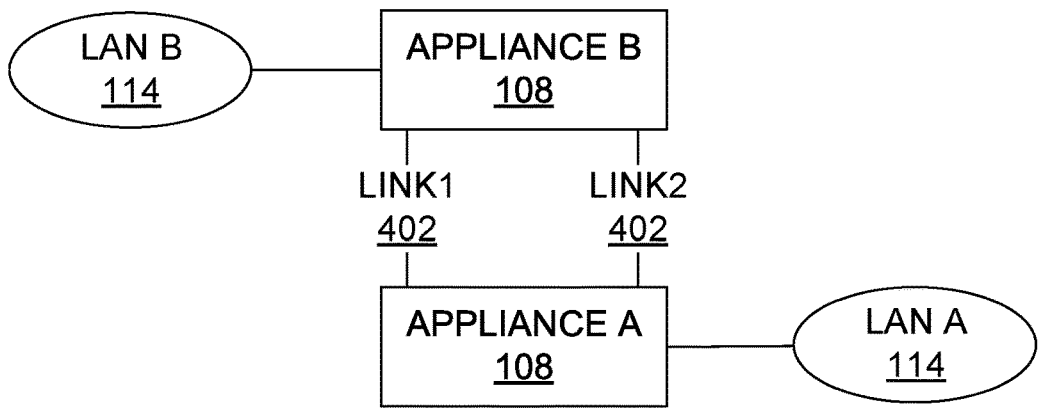
FIG. 5 is a diagram illustrating a network configuration in which two local area networks (LANs) are connectable to one another through two parallel secure actual links.

FIG. 5 illustrates some other advantages. The parallel links 402, labeled for convenience as link1 and link2, cannot all be used concurrently with a conventional approach to security associations. One would conventionally select either the WAN interface IP addresses of link1 for use in the security association, or else select the WAN interface IP addresses of link2 for use in the security association. Selecting link1 rules out use of link2 for carrying any packets through the VPN tunnel under the security association that is based on link1's addresses, and likewise selecting link2 rules out any use of link1 for carrying any packets through the VPN tunnel under the security association that is based on link2's addresses. So load balancing between link1 and link2 with a single given security association is not possible conventionally. Failing over from link1 to link2, or vice versa, is also not possible conventionally without creating a new security association.

However, by creating the tunnel's security association using virtual addresses, and mapping between the virtual addresses and the actual WAN interface IP addresses of link1 and link2, an embodiment may failover from one link to the other, and may share the packet traffic load between the links, without creating a new security association.

Figure 6:
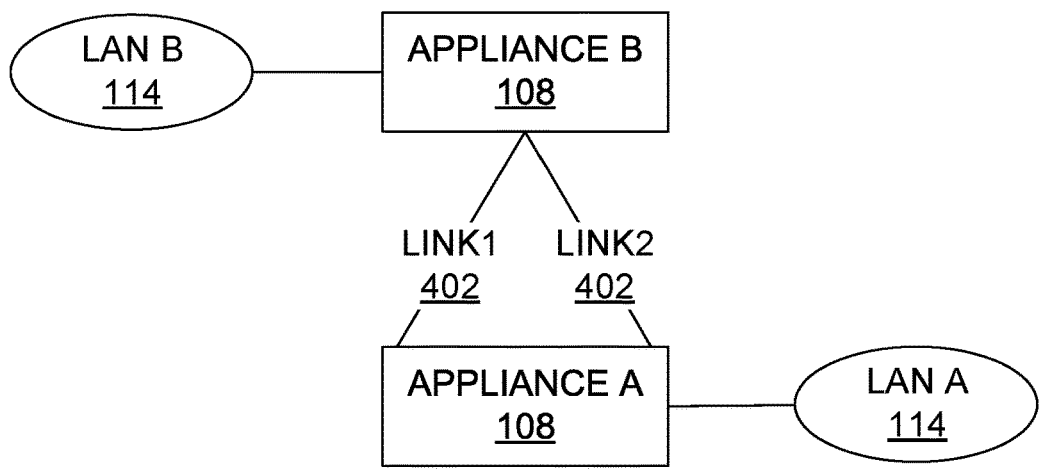
FIG. 6 is a diagram illustrating a network configuration in which two local area networks (LANs) are connectable to one another through two secure actual links that share an endpoint, namely, links in a many-to-one topology from LAN A's perspective, which is a one-to-many topology from LAN B's perspective.

Similar considerations apply to the configuration shown in FIG. 6. This configuration is effectively not permitted when conventional approaches to security associations are used. Only the actual address of one of the two WAN interfaces on appliance A would be used in the security association. So packets coming to appliance B from A's other WAN interface would be discarded as unauthorized. But with the approach taught herein, a virtual address can represent both of the WAN A interfaces in the security association.

Additional Example Processes

Figure 7:
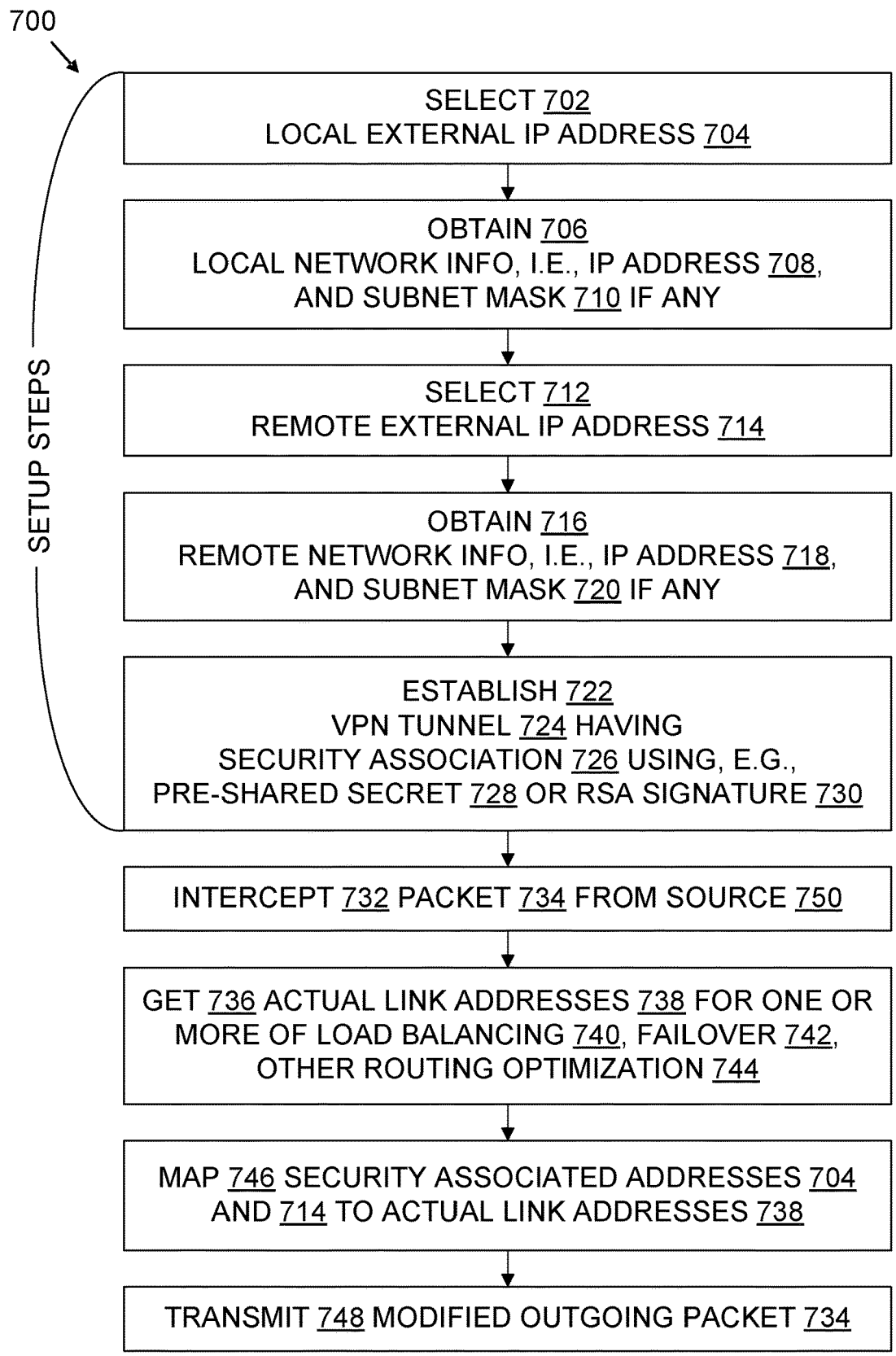
FIG. 7 is a flow chart illustrating aspects of some process and configured storage medium embodiments, including setting up a secure link and mapping from a pair of security-associated link addresses of the secure link to actual link addresses.
Figure 8:
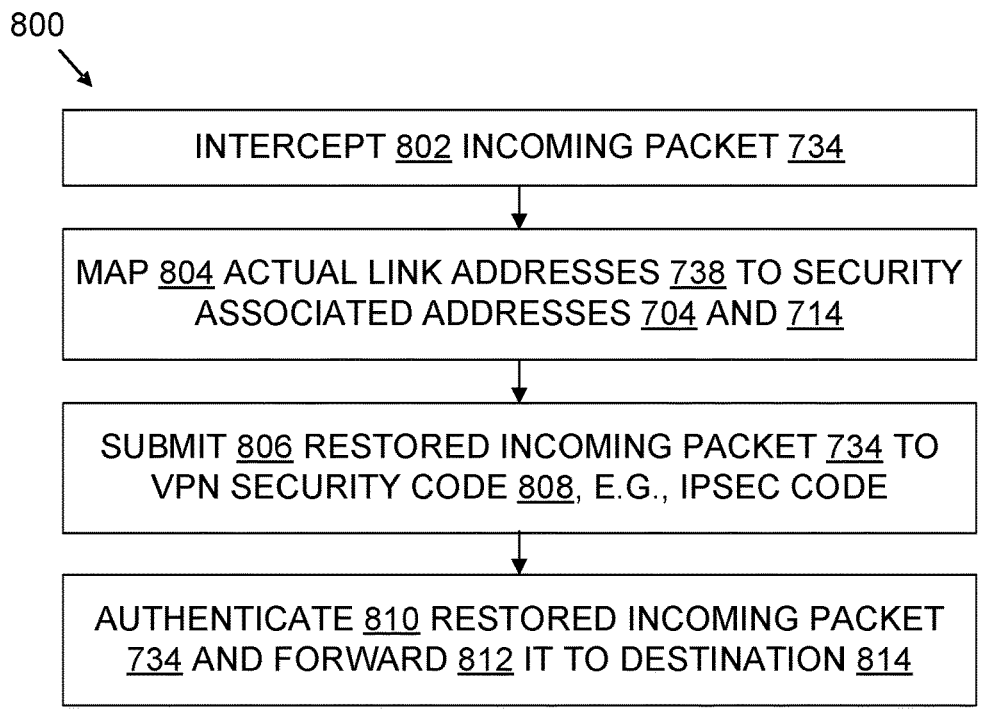
FIG. 8 is a flow chart illustrating aspects of some process and configured storage medium embodiments, including mapping from the actual link addresses of FIG. 7 to the pair of security-associated link addresses.
Figure 9:
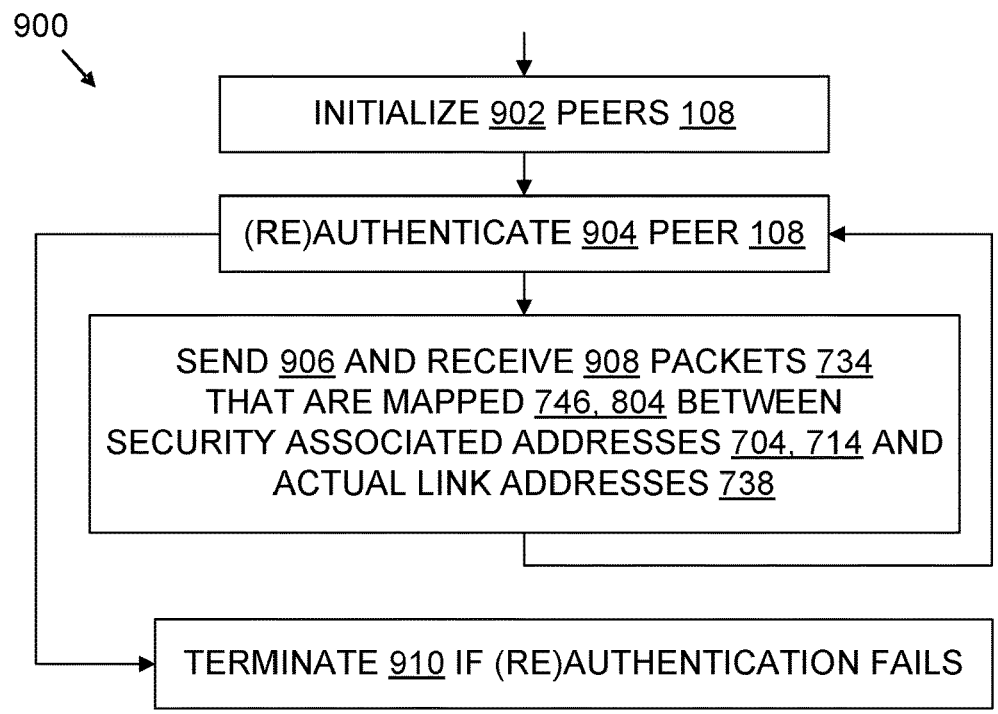
FIG. 9 is a flow chart illustrating aspects of some process and configured storage medium embodiments, including authenticating peer appliances that perform the address mappings illustrated in FIGS. 7 and 8.

FIGS. 7 through 9 further illustrate some processes for maintaining VPN tunnel security associations despite a departure from conventional usage of a single pair of WAN interface IP addresses as a security association basis. Steps shown in these figures may be combined with one another or with other steps described herein in various ways, e.g., they may be repeated, renamed, reordered, omitted, or grouped, provided the combination produces an operable process as result.

A selecting step 702 selects a local external IP address 704 for use in a security association (specifically, a security association pair). Conventionally, the local external IP address is a WAN interface address of a network device attached to a local LAN, and is entered by a user during VPN configuration. The present innovation permits the local external IP address 704 to be a virtual external IP address, which may be entered manually or generated by code 1006. Any value that meets the IP address syntax and uniquely identifies the local end of the VPN tunnel being set up can be used as the virtual local external IP address 704, since it operates not as an IP address per se in a transport protocol but rather operates as an index or key into a table 302 or other data structure that maps between one or more actual WAN interface IP addresses and the local endpoint of the VPN tunnel.

An obtaining step 706 obtains local network info for the local network that is behind the local external IP address 704. The local network info can be entered manually or be otherwise obtained using conventional mechanisms, and it will match the local network info used in conventional VPN tunnel creation. In particular, if the local network is actually a single machine then the local network info includes a single IP address. If the local network is a LAN, then the local network info includes a range of IP addresses which may be specified using a subnet mask 720. For example, the local network info might be specified as 10.2.0.0/24 in a particular system.

Similarly, a selecting step 712 selects a remote external IP address 714 for use in the security association with the local external IP address 704. Conventionally, the remote external IP address would be an actual WAN interface address of another network device, which is attached to a remote LAN, but the present innovation permits the remote external IP address 704 to be a virtual external IP address, which may be entered manually or generated by code 1006. Any value that meets the IP address syntax and uniquely identifies the remote end of the VPN tunnel being set up can be used as the virtual remote external IP address 714, since it operates not as an IP address per se in a transport protocol but rather as an index or key into a table 302 or other data structure that maps between one or more actual WAN interface IP addresses and the remote endpoint of the VPN tunnel. Tables, arrays, lists, trees, and other data structures may be used to help implement the mapping, and are referred to collectively herein as tables 302.

An establishing step 722 establishes the VPN tunnel 724. In particular, step 722 creates the VPN tunnel using a security association 726 that is based on the local external IP address 704 and the remote external IP address 714, at least one of which is a virtual endpoint IP address instead of a conventional (i.e., WAN interface transport layer) IP address. The security association 726 can be based as well on the remote and local network info, and based on a security credential known to the appliances 108 at the tunnel endpoints and provided to them by the user or by the system. Examples of security credentials include a pre-shared secret 728, or an RSA signature 730. These security credentials may be the same as in a conventional VPN tunnel creation scenario, and they may be obtained using familiar key management tools, e.g., IKE.

Conventional analogues of steps 702, 712, and 722, with steps 706, and 716, are used to recreate the VPN tunnel in a conventional system when the underlying external IP address (which conventionally is a WAN interface address) changes for some reason. Using the innovative virtual IP address and mapping taught herein allows a system to avoid performing those tunnel recreating steps, since the originally created VPN tunnel can still be used despite a change in the actual WAN interfaces that are being used to carry traffic through the VPN tunnel. With the innovative approach, the setup steps 702, 706, 712, 716, and 722 need be performed only once for a given VPN tunnel and a session through that tunnel can persist despite changes in which actual WAN interfaces are used to carry packets of the session.

During an intercepting step 732, the innovative appliance 108 intercepts a packet 734 that is being sent toward the other end of the VPN tunnel 724. The intercepted packet contains the external IP addresses 704, 714 specified in the security association as its source and destination addresses. Since either or both of these is a virtual address, they are mapped 746 to actual (i.e., WAN interface 120 transport layer) addresses 738 which are placed in the packet before sending the packet out of the appliance. To get 736 the actual addresses 738 to use, that is, to choose which WAN interface(s) to use for a given session, the appliance may perform load balancing 740 (per-packet or per-session), failover 742, another routing optimization 744, or a combination of such routing optimizations 744. Operations such as compression or encryption or de-duplication may be performed on the packet 734. Then the modified packet 734 is transmitted 748 out the chosen WAN interface toward the other end of the VPN tunnel. Steps 732, 736, 746, 748, and optionally one or more of steps 740, 742, 744 are sufficient to constitute sending 906 the packet; other steps may also be performed when sending.

During an intercepting step 802, the innovative appliance 108 at the other end of the VPN tunnel 724 intercepts the modified packet 734. The intercepted packet contains actual WAN interface IP addresses 738 as its source and destination addresses. Using a table 302 updated by one or more exchanges between the peer appliances 108 during peer initialization 902, the actual addresses 738 are mapped 804 back (i.e., restored) to the addresses 704, 714 specified in the security association for the VPN tunnel. Thus, when the restored packet is submitted 806 to IPsec code or other authentication 810 code 808, the packet passes instead of being rejected. Operations such as decompression or decryption may also be performed on the packet 734. Then the restored and authenticated packet 734 is forwarded 812 to the destination 814 at this end of the VPN tunnel. Steps 802, 804, and 806 are sufficient to constitute receiving 908 the packet; other steps may also be performed when receiving packet traffic.

Peer authentication 904 may be performed at intervals between the appliances 108 at the ends of the VPN tunnel. For instance, a challenge handshake authentication like the procedure specified in RFC 1994 may be used periodically. If the authentication fails, the appliances terminate 910 communication; the VPN tunnel is effectively destroyed by the authentication failure. Suitable re-authentication intervals may be specified by the user or the appliance code 1006, e.g., by specifying a time in the range from one to twenty minutes.

Multi-Domain Multi-Policy Path Overlay Auto-Configuration

An original problem to be solved is this: How can a VPN be configured without using multicast protocols? Traditional routing protocols work on multicast technology. For example, an OSPF packet could not travel over the internet because it is a multicast packet. In some embodiments taught herein, auto-configuration creates a virtual private network dynamically by updating each site with learned networks and updating IPSec tunnel(s) dynamically. Some embodiments provide self-learning auto-configuration, e.g., the device being added to a network learns configuration information and configures itself. Some embodiments provide centrally orchestrated configuration, e.g., a single point of configuration is used where other approaches (especially those involving multiple vendors) require or use multiple configuration management consoles.

Another problem to be solved is this: How can a VPN be configured in a hybrid private/public WAN? Some embodiments described herein provide the VPN over different types of connections, including for example public internet 112 connections or private mpls connections. In particular, by using a logical path overlay 302 and address mapping 746, 804 as described herein, some embodiments can split tunnels between MPLS and Internet connections. Unlike other technologies, technology described herein in some embodiments can create a tunnel between private and public networks. Innovative products with their overlay create a single "virtual" tunnel over multiple types of connections.

Another problem to be solved is this: How can a VPN be configured (including initialization 902) when some of the machines in the VPN would traditionally be configured from one central management console and other machines in the VPN would traditionally be configured from another central management console and the two central management consoles are not designed to communicate with each other?

Consider an example which includes a VPN using a first domain with vendor1 machines and a second domain with vendor2 machines. Each domain traditionally would have its own central management console. Communication between such consoles can be hampered in that some aspects of the central management consoles will be trade secrets. Teachings herein support auto-configuration, whereas a traditional console requires an administrator to register each device manually. A drawback of manual configuration is that if the registered device is behind a cable modem that ip address could change anytime. There could thus be false configurations by statically defining address(es). Another drawback of manual configuration is that it involves lots of time to add/delete the device info and also add IPSec tunnel, route rules, etc., and these operations are error-prone when done by people. Traditional configuration does not scale to a large number of devices, e.g., hundreds or more.

One embodiment works as follows.

Assume that every machine 116 can be reached from a FatPipe controller 108. Assume also that each FatPipe controller has a list of interface IP addresses or corresponding domain name and a list of policy templates.

The IP address that identifies the FatPipe controller is the IP address of its WANx interface. As indicated by the 'x' in 'WANx', the interface used does not necessarily need to be the WAN1 interface. The controller does not have to be a FatPipe routing device. It could be a standalone management device, which has one or more interfaces. As long as the controller 108 is reachable from the machine being auto-configured, the controller does not need to be a router with a LAN interface and WAN interface. The IP address list or domain name list is for branch or HQ devices to access the controller. For example, in some examples a controller has a list of interface addresses of interfaces 120 on the controller. Each interface has its own IP address and/or domain name. To reach the controller, the branch or HQ device can try each domain name or IP address in that interface address list.

The IP address that identifies the FatPipe controller is assigned by a network administrator. Each interface 120 will have its own IP address and/or corresponding domain name. Each controller could have a list of network interface cards, and thus have a list of interface IP addresses.

The policy template for a FatPipe controller includes information such as the IP address of the FatPipe controller and an authentication string. The policy template is created/generated/assigned by the network administrator. There is one policy template per configuration domain, but a single FatPipe controller can have one or more policy templates. Each policy template has two attributes: an address list and a single authentication string. The controllers address list could be a list of IP addresses or a list of domain names or both. The administrator of the controller has rights to create the policy templates. Each controller can have one or more policy templates. For instance, each branch could have one or more policy templates to allow a branch to connect to different controllers or use different policy templates to create different networks using the same controller.

The authentication string is a char string for each policy template per controller. The authentication string is created/generated/assigned by an administrator of the controller. In one embodiment, the authentication string is implemented using Google Protocol Buffers ("protobuf") but other implementations could use JSON or XML or RESTful services, for example. Google protobuf could be converted into JSON format which is used for RESTful API services.

Below is an example of a protobuf format for the policy template for each device to be configured.

```
message IpsecTemplate
{
optional string local_wan_interface_name; optional string
remote_wan_interface_name; optional string ike_crypto_method; optional string
ike_key; optional string rsa_info; optional string esp_crypto_method; optional string
esp_key; }
message MpsecTemplate
{
optional string hello_interval; // how often the path check packet will be sent
optional string path_down_interval; // when to mark mpsec path as disconnected
or down; e.g., if path_down_interval is 2 seconds and hello interval is 1 second,
mark as mpsec path as disconnected or down if in 2 second do not receive path
check packet
optional LoadBalanceInfo load_balance_info; }
message ConfigurationTemplate
{
optional bool topology_type = 1; //This indicates whether it is hub-spoke, fully
meshed optional IpsecTemplate ipsec_template; optional MpsecTemplate
mpsec_template; optional RoutesTemplate routes_template; repeated
PolicyRoutingRuleTemplate policy_routing_rule_template; }
message DeviceInfo
{
optional bool is_hq = 1; //Indicate whether this device is HQ device. If it is true.
repeated string wan_interface_address = 2; }
message PolicyTemplate
{
repeated string controller_address = 1; //The controller_address is a list of string
which could be either //ip address of domain name for controller's interface(s)
required string hash_of_authentication_string = 2; //This is the hash value of the
authentication string optional ConfigurationTemplate = 3; //This is configuration
template which is only created at //the controller.
repeated DeviceInfo device_info = 4; //This holds the information for each joined
device }
```

```
message ProtocolOspf {
  optional string name = 1;
  optional int32 enable = 2;
  optional int32 rfc_1583 = 3;
  optional int32 stub_router = 4;
  optional int32 ecmp = 5;
  optional int32 ecmp_limit = 6;
  optional int32 recalculate_route = 7;
  repeated Area area = 8;
  ....
}
message ProtocolBgp {
  optional bool enable = 1;
  optional string name = 2;
  optional int32 local_as = 3;
  optional string neighbor_ip = 4;
  optional int32 neighbor_as = 5;
  optional bool multihop = 6;
  optional int32 hops = 7;
  optional string source_address = 8;
  optional bool next_hop_self = 9;
  optional bool next_hop_keep = 10;
  optional bool ttl_security = 11;
  ...
}
message SnmpServer {
  optional string name = 1;
  optional string ip = 2;
  optional int32 port = 3;
  optional int32 version = 4;
  optional string community = 5;
  optional string password = 6;
}
message NetworkObjectConfig {
  repeated NetworkObject network_object = 1;
  repeated NetworkServices network_service = 2;
  repeated SnmpServer snmp_server = 3;
}
```

ConfigurationTemplate refers to a RoutesTemplate. A RoutesTemplate defines routing rules for static routes, dynamic routes (such as RIP, OSPF, BGP, or/and query routing table from other vendor's SNMP routing table) which allows it to work with proprietary routing protocol such as EIGRP.

The BGP and OSPF examples are each for a dynamic routing protocol. Below is the static routing template. Each dynamic routing protocol has its own routing protocol logic and they function independently of each other. Ultimately, they all could update the operating system's routing table.

```
message StaticRouteInfo {
  optional string network = 1;
  optional string mask = 2;
}
message StaticRouteObject {
  optional string object_name = 1;
  optional string gateway = 2;
  optional int32 metric = 3;
  repeated StaticRouteInfo static_route_info = 4;
}
message StaticRouteConfig {
  repeated StaticRouteObject static_route_object = 1;
}
message NetworkObject {
  optional string name = 1;
  repeated Network nw = 2;
}
```

ConfigurationTemplate refers to a PolicyRoutingRuleTemplate. PolicyRoutingRuleTemplate implements a user defined routing rule which is based on the traffic pattern and corresponding action to transform the packet. The transformation process may include compression, caching, QOS scheduling, TCP optimization, encryption, NAT, etc.

```
message PolicyRouteRule {
  optional int32 position = 1;
  optional int32 rule_type = 2; // e.g., INBOUND / OUTBOUND
  optional string name = 3;
  optional bool schedule_enabled = 4;
  optional string src_ip_range = 5;
  optional string src_port_range = 6;
  optional string dest_ip_range = 7;
  optional string dest_pot_range = 8;
  optional int32 protocol = 9;
  optional int32 traffic_mode = 10;
  optional int32 wan_to_wan = 11;
  optional bool web_redirect = 12;
  optional bool webfilter_relay = 13;
  optional bool ipsec_bypass = 14;
  optional bool http_proxy = 15;
  optional bool https_proxy = 16;
  optional bool server_load_balance = 17;
  optional bool udp_aggregation = 18;
  optional bool eq_bw_dist = 19;
  optional int32 dscp = 20;
  optional string qos_name = 21;
  repeated InterfaceAction interface_action = 22;
  repeated Schedule schedule = 23;
  repeated L7Rule l7_rule =24;
  repeated int32 src_interface_port = 25;
  optional int32 dest_interface_type = 26;
  optional bool host_name_based = 27; // 0 == ip based 1 == host name
  optional string host_name = 28;
  optional bool follow_sys_route = 29;
  optional bool web_authentication = 30;
  optional string webfilter_profile_name = 31;
  repeated string webfilter_group = 32;
  repeated string webfilter_user = 33;
```

-continued

```
    optional bool udp_peer_detect = 34;
    optional string src_network_obj_name = 35;
    optional string src_service = 36;
    optional string dst_network_obj_name = 37;
    optional string dst_service = 38;
    optional bool is_auto_configured = 39;
    optional string app_profile_name = 40;
}
```

In some embodiments, logical path(s) are constructed locally on each device. Logical paths are not transferred using protobuf message. The protobuf message contains each device's interface address only, not the logical path.

The first phase of auto-configuration runs on whatever machine is being added to the VPN. This is called the "configuration domains phase". During this phase, the machine being added discovers its closest FatPipe controller by IP address or the domain name of the controller. Then it downloads the configuration template from the controller.

The machine being added gets the IP address or the domain name of the controller from a network administrator. On each device's GUI, for example, the network administrator preconfigures the policy template device to specify the controller's address list and authentication key for that policy template.

At Phase 1, the device talks to the controller and gets authenticated. It uses a previously defined controller's address list to communicate with the controller and send protobuf message PolicyTemplate to the controller. The controller authenticates the device by iterating through its list of policy templates and searching for a matched policy template, namely, one having the identical hash value of the authentication string.

The second phase of auto-configuration also runs on whatever machine is being added to the VPN. This is called the "configuration policies phase". During this phase, the machine being added downloads all the configuration policies from the controller. In one embodiment, it downloads the configuration template (ConfigurationTemplate protobuf object).

Each policy includes a policy detail, a list of devices that follow this policy, and a policy topology. The list of devices is a list of IP addresses; each device is identified by the WANx interface IP address of the device. In one embodiment, protobuf message DeviceInfo contains a list of wan_interface_address values that belong to each device that has been authenticated and configured in the group of devices that belong to the VPN.

Policy detail includes information such as whether IPsec is being used, and if it is, the IPsec key; RSA keys 730 if they are being used; public certificates if they are being used; and MPSec® load balancing 740 parameters (MPSec is a mark of FatPipe Networks).

The supported policy topologies are hub-and-spoke (also called "star"), and fully-meshed. Other implementations could support a ring topology, or custom topology.

The third phase of auto-configuration also runs on whatever machine is being added to the VPN. This is called the "configuration overlay phase". During this phase, the machine being added creates a table of logical paths (e.g. MPSec® paths) which overlays the VPN connections (e.g., IPSec security association connections).

As an example, consider a configuration that has an HQ connecting via VPN with a branch office device behind a DSL modem. Using teachings herein, IP addresses may be reassigned by DHCP without breaking an IPSec session. An overlay packet 734, e.g., an MPSec® hello packet payload after layer 3 protocol fields, contains the FatPipe WAN interface IP address. Even if the DSL modem changed (e.g., by NAT) the packet, the remote peer 108 will know the internal IPSec end IP address and internal WAN interface address of remote FatPipe, as well as the publicly accessible IP address on that path.

During the configuration overlay phase, the machine being added creates a table 302 of logical paths (e.g. MPSec® paths) which overlays the VPN connections (e.g., IPSec security association connections). In one example, a data structure defined below holds the table of MPSecpaths. Note that "table" in this implementation corresponds to lists 302. Each MPSec path is defined as below. Each IPSec tunnel has its own list of MPSecpaths.

```
struct mpsec_path
{
    sttruct list_head list;
    struct net_device* local_wan_interface;
    uint32_t remote_external_ip_adress;
    uint32_t remote_interface_ip_adress;
};
struct ipsec_tunnel
{
    struct list_head ipsec_list;
    struct list_head mpsec_path_list;
    uint32_t local_external_ip_adress;
    uint32_t remote_external_ip_adress;
}
```

Although in one view WAN1-WAN2 would be the same logical path as WAN2-WAN1, the MPSecpath in the present embodiment is only related to a local device's perspective, and in that sense is unidirectional. Also, in practice an address does not relate to itself in an MPSecpath.

Consider an example in which a controller 108 FPHQ has public ip address P2 reaching a DSL modem interface at ip address P1. The other side of the modem has an interface at I1 which is reachable to a controller FPBR 108 at current interface address I2:

FPHQ(P2)—(P1)Modem(I1)—(I2)FPBR

Assume there is a security association 726 between FPHQ address P2 and FPBR address I2. The DSL modem has public address P1 and private address I1. Assume for the moment that the logical paths do not include paths from an interface to itself, and assume that logical paths are bidirectional. Then the logical paths in the example would be P2-P1, P2-I1, P2-I2, P1-I1, P1-I2, and I1-I2. However, this embodiment in this example only cares about P1-P2 and I1-I2. The MPSecpath knows the remote FatPipe device WAN interface public IP as well as private IP address.

P2-I2 is chosen as the path to use in the security association, because an IPSec tunnel's ip address should be on the device itself. One does not use the modem's ip address as an IPSec tunnel ip address for an IPSec tunnel between the two controllers FPHQ and FPBR.

Now suppose that after a modem reboot, the FPBR device address becomes I3 instead of I2. The Ipsec_tunnel does not change since it will use a virtual static ip address. Only mpsec_path updates the remote public and private ip address. That way MPSeclogic could recover (i.e., map) the packet to the original IPSec packet.

The following example may also be helpful. Assume the indicated configuration, where FatPipeA and FatPipeB include controllers 108:

FatPipeA(WAN1:192.168.1.2)—RouterA(LAN 192.168.1.1 WAN 11.0.0.2)—RouterB(WAN 11.0.0.1 LAN10.0.0.1)—FatPipeB(10.0.0.2)

In this example, first consider the case when neither routerA nor routerB does NAT. Then any device can create IPSec tunnel between 192.168.1.2 and 10.0.0.2.

Now consider the case when RouterB has to NAT. Without MPSec or similar overlay usage as taught herein, the IPSec end ip has to be the ip reachable by each peer. In this case, the IPSec tunnel has to between 192.168.1.2 and 11.0.0.1 since on 11.0.0.1 is reachable from FatPipeA. If RouterB changes its ip after reboot, then the configuration forces use of a new IPSec policy with end ip 192.168.1.2 and new wan ip from RouterB. But with MPSec technology, one could consistently use the same IPSec end ip (192.168.1.2 and 10.0.0.2) regardless of the reboot. The MPSecpath on FatPipeA says to reach 10.0.0.2, its MPSecpath has to send to RouterB's WAN ip. That WAN ip could be learned through an MPSecpath checking packet. So with the innovative mapping there is no need to create/change IPSec end ip when routerB change its ip address.

Advantageously, the teachings herein permit auto-configuration using unicast packets. In the WAN, only unicast packets are fully supported. For instance, one of skill will acknowledge that multicast protocols only work in broadcast type media such as a LAN in which every device is connected to the same broadcast domain. In the WAN (wide area network), each FatPipe device is not directly connected and an ISP normally drops all multicast packets instead of forwarding them. Also, in the WAN, most modems will NAT the inside address, and both the modem external address and internal DHCP address will change when the modem reboots. By contrast, in a traditional LAN, the IP address of the router is statically assigned and does not change.

One of skill will acknowledge that attempts to use a traditional single central management console to do these phases would not work. A single central management console is not flexible enough for a company to have multiple levels of security and access to different third party vendor networks. By using multiple policy templates as taught herein, each device could be authenticated with different controllers. Also, a given controller could be authenticated with multiple policy templates to allow different security level access for different types of networks.

Some embodiments use standard IPSec/GRE tunnels which could work with non-FatPipe IPSec devices as well. After creating the tunnel 724, an embodiment may auto-configure the MPSecpaths. From an end user's perspective, there is one IPSec tunnel, but MPSecor other logical paths provide multiple layer 3 and below network paths for that tunnel, using actual WAN interface 120 addresses. The default IPSec tunnel just define a single reachable path. In a FatPipe appliance 108, an IPSec tunnel defined path might not be reachable in the layer 3 and below connectivity sense as "reachable" is conventionally viewed, but an MPSecpath may allow the non-reachable path to become reachable by mapping as described herein. One example is an IPSec device behind a cable modem which does NAT. Also if the path is down, the conventional default tunnel has to renegotiate the IPSec key before it could establish an authenticated tunnel again. The MPSecpath will keep the existing tunnel still authenticated when a path is down and connectivity is available over another path.

Further Examples

Some embodiments use or provide a computer-readable storage medium 1004 configured with data and with instructions 1006 that when executed by at least one processor 1002 causes the processor(s) to perform a technical process for mapping between logical paths and network reachable paths, the process including: identifying a secured path between two IP addresses denoted here as IP-A and IP-C which reside on respective devices denoted here as device-A and device-C, when a device-B is interposed between device-A and device-C so that packets between device-A and device-C travel through device-B; and when an IP address IP-B on device-B changes from IP-B to IP-B' then mapping packet addresses between actual IP addresses and virtual IP addresses to allow continued use of the secured path.

Some embodiments use or provide a computer system including: a logical processor 1002; a memory 1004 in operable communication with the logical processor; and an auto-configuration program 1006 residing in the memory which upon execution by the processor performs a configuration domains phase, a configuration policies phase, and a configuration overlay phase.

CONCLUSION

Although particular embodiments are expressly described herein as processes, as configured media, or as systems, it will be appreciated that discussion of one type of embodiment also generally extends to other embodiment types. For instance, the descriptions of processes also help describe configured media, and help describe the technical effects and operation of systems and manufactures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item stated need be present in every embodiment. Although some possibilities are illustrated here by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A secure networking process comprising:
establishing a virtual private network (VPN) tunnel which has a security association which is specified with at least a source virtual IP address that is not an actual wide area network (WAN) interface address and which is also specified with at least a destination virtual IP address that is not an actual WAN interface address;
intercepting an outgoing packet that is directed from a source endpoint of the VPN tunnel toward a destination endpoint of the VPN tunnel;
modifying the outgoing packet by replacing an instance of the source virtual IP address in the outgoing packet with an actual address that is the IP address of an outgoing WAN interface at a local site, and modifying the outgoing packet by replacing an instance of the destination virtual IP address in the outgoing packet with an actual address that is the IP address of an incoming WAN interface at a remote site; and then
transmitting the modified outgoing packet through the outgoing WAN interface at the local site toward the incoming WAN interface at the remote site.

2. The process of claim 1, further comprising:
intercepting the modified outgoing packet after it has reached the incoming WAN interface at the remote site;
modifying the intercepted packet by replacing the actual address of the incoming WAN interface with the destination virtual IP address and by replacing the actual address of the outgoing WAN interface with the source virtual IP address; and then
submitting the modified intercepted packet for an authentication that is based on the security association.

3. The process of claim 2, wherein the submitting step submits the modified intercepted packet for an IPsec authentication.

4. The process of claim 2, wherein the process maps the security association to pairs of actual WAN interface addresses that define at least two parallel paths between the local site and the remote site.

5. The process of claim 2, wherein the process maps the security association to actual WAN interface addresses that define at least two paths between the local site and the remote site that share the same WAN interface at one site and do not share any WAN interface at the other site.

6. The process of claim 1, further comprising a remote appliance at the remote site and a local appliance at the local site authenticating to one another before the local appliance performs the packet intercepting, packet modifying, and packet transmitting steps.

7. The process of claim 1, further comprising a remote appliance at the remote site failing to authenticate itself to a local appliance at the local site, and then the local appliance terminating the VPN tunnel in response to the authentication failure.

8. The process of claim 1, further comprising a local appliance at the local site performing at least one of the following to get the actual address that is the IP address of the outgoing WAN interface at the local site: load balancing or failing over.

9. The process of claim 1, further comprising a local appliance at the local site participating in a multi-phase auto-configuration by executing at least a portion of an auto-configuration program.

10. A secure networking process comprising:
establishing a virtual private network (VPN) tunnel which has a security association which is specified with at least a source virtual IP address that is not an actual wide area network (WAN) interface address and which is also specified with at least a destination virtual IP address that is not an actual WAN interface address;
intercepting an outgoing packet that is directed from a source endpoint of the VPN tunnel toward a destination endpoint of the VPN tunnel;
performing at least one of the following to get an actual address that is an IP address of an outgoing WAN interface at a local site: load balancing, failing over, or another routing optimization;
modifying the outgoing packet by replacing an instance of the source virtual IP address in the outgoing packet with the actual address that is the IP address of the outgoing WAN interface at the local site, and modifying the outgoing packet by replacing an instance of the destination virtual IP address in the outgoing packet with an actual address that is the IP address of an incoming WAN interface at a remote site;
transmitting the modified outgoing packet through the outgoing WAN interface at the local site toward the incoming WAN interface at the remote site;
intercepting the modified outgoing packet after it has reached the incoming WAN interface at the remote site;
modifying the intercepted packet by replacing the actual address of the incoming WAN interface with the destination virtual IP address and by replacing the actual address of the outgoing WAN interface with the source virtual IP address; and
submitting the modified intercepted packet for an IPsec authentication that is based on the security association.

11. The process of claim 10, wherein the process maps the security association to pairs of actual WAN interface addresses that define at least two parallel paths between the local site and the remote site.

12. The process of claim 10, wherein the process maps the security association to actual WAN interface addresses that define at least two paths between the local site and the remote site that share the same WAN interface at one site and do not share any WAN interface at the other site.

13. The process of claim 10, further comprising a remote appliance at the remote site and a local appliance at the local site authenticating to one another before the local appliance performs the packet intercepting, packet modifying, and packet transmitting steps.

14. The process of claim 10, further comprising a remote appliance at the remote site failing to authenticate itself to a local appliance at the local site, and then the local appliance terminating the VPN tunnel in response to the authentication failure.

15. The process of claim 10, further comprising a local appliance at the local site participating in a multi-phase auto-configuration by executing at least a portion of an auto-configuration program.

16. A network appliance comprising:
   at least one wide area network (WAN) interface having an actual IP address, namely, an IP address which has been statically or dynamically assigned and has been or will be advertised across a network connection;
   at least one local area network (LAN) interface;
   a processor;
   a memory in operable communication with the processor;
   an overlay code residing in the memory which upon execution by the processor performs a secure networking process which intercepts a packet received at the LAN interface, maps two security associated addresses in the packet to actual addresses, one of the actual addresses being the WAN interface actual IP address, and modifies the packet to include the WAN interface actual IP address in place of a source address which is one of the security associated addresses in the packet; and
   a transmitter code which transmits the modified packet out the WAN interface.

17. The network appliance of claim 16, denoted here as a first network appliance, in combination with a second network appliance, the second network appliance comprising:
   at least one WAN interface having an actual IP address;
   at least one LAN interface;
   a virtual private network (VPN) authentication module;
   a processor;
   a memory in operable communication with the processor;
   an overlay code residing in the memory which upon execution by the processor performs a secure networking process which intercepts the modified packet after it is received at the second network appliance's WAN interface, maps actual addresses in the packet back to the security associated addresses using a table in the memory, thereby restoring the security associated addresses in the packet, and submits the packet with restored security associated addresses to the VPN authentication module for authentication prior to transmittal of the packet to the LAN interface.

18. The network appliance of claim 17, wherein the table maps the security associated addresses to network connections between the first network appliance and the second network appliance, and the connections are parallel and do not share any WAN interface with one another.

19. The network appliance of claim 17, wherein the table maps the security associated addresses to network connections between the first network appliance and the second network appliance, and the connections are not parallel and share at least one WAN interface with one another.

20. The network appliance of claim 16, further comprising at least one of the following:
   code which authenticates the network appliance to another network appliance;
   code which terminates a tunnel connecting to the network appliance in response to another network appliance failing to authenticate to the network appliance; or
   code which auto-configures the network appliance.

* * * * *